United States Patent [19]

Retzer et al.

[11] Patent Number: 5,239,691
[45] Date of Patent: Aug. 24, 1993

[54] RESILIENT HOUSING ACTUATED MULTI-LEVEL SWITCH

[75] Inventors: Michael H. Retzer, Palatine; Timothy W. Markison, Hoffman Estates, both of Ill.

[73] Assignee: Motorola Inc., Schaumburg, Ill.

[21] Appl. No.: 765,271

[22] Filed: Jan. 6, 1992

[51] Int. Cl.⁵ ............................................. H04B 1/38
[52] U.S. Cl. ....................................... 455/89; 455/90; 455/128; 455/347; 200/511
[58] Field of Search .............. 200/511, 514; 338/99, 338/114; 455/89, 90, 128, 347

[56] References Cited

U.S. PATENT DOCUMENTS

| | | | |
|---|---|---|---|
| 3,225,883 | 12/1965 | Ayers | 341/34 |
| 3,960,044 | 6/1976 | Nagai et al. | 200/511 |
| 4,225,970 | 9/1980 | Jaramillo et al. | 455/90 |
| 4,975,676 | 12/1990 | Greenhalgh | 338/114 |

Primary Examiner—Reinhard J. Eisenzopf
Assistant Examiner—Philip J. Sobutka
Attorney, Agent, or Firm—Timothy W. Markison; Steven G. Parmelee

[57] ABSTRACT

A resilient housing actuated multi-level housing switch comprises a compression sensitive circuit which is actuated by compressing a resilient housing. The compression sensitive circuit comprises a compression sensing device which produces an analog signal, an A to D converter, and a microprocessor. The microprocessor is programmed with algorithms to control the power levels of communication equipment and volume levels based on signals produced by compressing the compression sensing device.

7 Claims, 2 Drawing Sheets

RESILIENT HOUSING ACTUATED MULTI-LEVEL SWITCH

FIELD OF THE INVENTION

This invention relates generally to pushbutton switches, and in particular to a resilient housing actuated multi-level switch.

BACKGROUND OF THE INVENTION

Typically, two-state pushbutton switches are used to control sourcing of power to, and/or providing binary state information to, electronic communication equipment. When the switches are providing binary information, it is inputted to a microprocessing device which provides control functions for the electronic communication equipment. Electronic communication equipment, such as portable and/or mobile radios, utilize such control functions to perform Push-to-Talk functions, keypad functions, etc. Regardless of the versatility of the uses of the two-state pushbutton switch is it still only provides one of two signals, i.e. whether it is open or closed.

To expand the uses of two state pushbutton switches, switches have been cascaded into arrays to perform continuous range functions such as volume or brightness control. To achieve the continuous range, the array of switches is coupled to a microprocessor using some mathematical algorithm to provide the final control function. An alternative to using multiple switches for continuous range functions, is to use a single switch that is pressed multiple times which are counted by a microprocessor to produce the final control signal. Of course, rotary knob switches may be used for continuous range functions, however, a problem arises, as it does for switch arrays and multi-press switches, in that implementation of such devices may be costly and/or cumbersome to use. This problem is amplified for small hand held radios due to the very small area allotted for controls and the ever increasing number of features offered.

One known improvement of two-state pushbutton switches is to provide a tri-state pushbutton switch. Tri-state switches are commonly used in cameras to activate the light meter and the shutter. This is accomplished by using two sets of mechanical actuators, which, by pressing the button part way down, switches the first set of actuators causing the light meter to turn on. Pressing the switch all the way down, switches the second set of actuators causing the shutter to trip. This operation is fairly simple and intuitive to a user, even though it is accomplishing a rather complexed control operation with a single button. Nevertheless, such tri-state switches have limited usefulness due to the small number of mechanical actuators available.

Another known improvement of two-state pushbutton switches is to provide it with secondary inputs, such as pressure or velocity sensing. Such switches are commonly used in electronic keyboard musical instruments to alter the characteristics of the musical sound being generated. Presently, however, secondary inputs are only available on the musical keys of the instrument.

Regardless of the pushbutton switch used, it is difficult to environmentally protect portable and/or mobile radios from hostile environments. To waterproof and/or dustproof a radio, all openings in the radio's housing must be sealed, including any openings for pushbutton switches, which, for many radios, dramatically increases their production costs. Therefore a need exists for an apparatus which reduces the number of pushbutton switches needed by increasing the functionality of the switches with minimal increase in complexity of use. In addition, a further need exists for a resilient housing actuated switch to eliminate the need for openings in the housing for pushbutton switches.

SUMMARY OF THE INVENTION

These needs and others are substantially meet by the resilient housing actuated multi-level switch disclosed herein. The resilient housing actuated multi-level switch comprises a resilient housing, a compression sensing device, and a signal conversion device. When sufficient compression is applied to the resilient housing, the compression sensing device senses the compression and produces a compression signal. The compression signal is converted into an electrical signal by the signal conversion device such that the signal can be used by an electronic circuit which is housed in the housing.

DESCRIPTION OF A PREFERRED EMBODIMENT

Generally, the present invention provides a means for improving push button controls for communication equipment. By providing multiple functions and substantially eliminated the need for a push button, the number of control operations that a single switch can perform is dramatically increased. This is accomplished by providing a means for detecting a deflection distance based on compression of the resilient housing. Depending on the desired sensitivity of the switch, the detected deflection distance may be broken into several regions wherein each region provides a different signal to the communication equipment. In addition, the resilient housing actuated multi-level switch may provide multiple signals for at least two different control functions. By pressing a first area of the resilient housing, a first multilevel control signal may be produced. By pressing a second area of the resilient housing, a second multi-level control signal may be produced. A third multi-level control signal may be produced by pressing the first area and the second area simultaneously.

Figure 1:
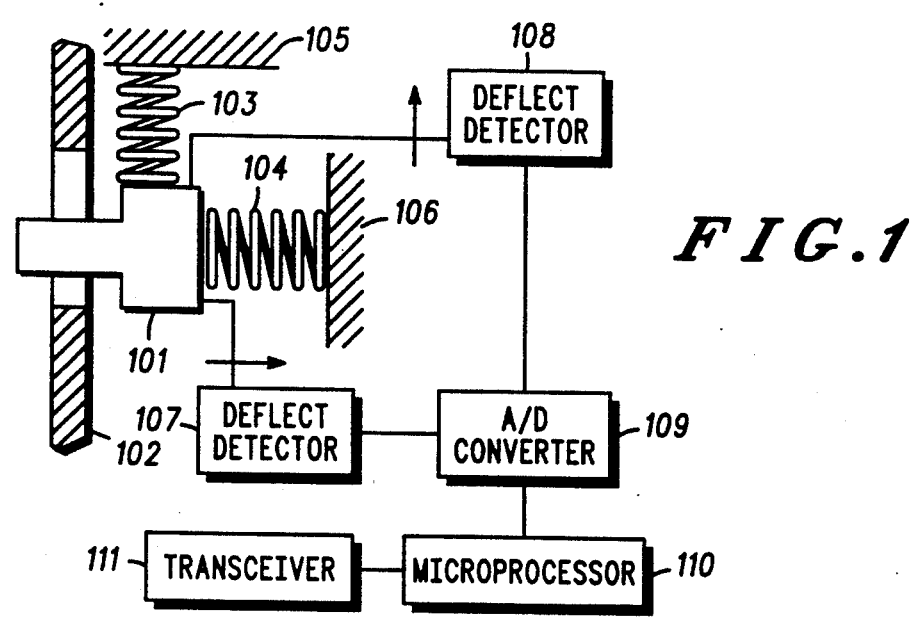
FIG. 1 illustrates a block diagram of a multi-level pushbutton switch that incorporates a deflection measuring transducer as the compression sensing device in accordance with the present invention.

FIG. 1 illustrates a block diagram of a multi-level switch. The multi-level switch comprises an actuatore 101, which penetrates through a housing 102. The switch further comprises compression devices which may be springs 103 and 104, deflection detection circuits 107 and 108, fixed surfaces 105 and 106, an A to D converter 109, and a microprocessor or equivalent 110. For this type of switch to be used in communication equipment such as portable and/or mobile radios, the switch would then be connected to a radio transceiver 111. By pushing the actuator 101 in the horizontal direction with respect to the illustration of FIG. 1, the deflection detection circuit 107 detects how far the switch is compressed. The deflection detection circuit 107 produces an analog signal based on the detected compression and routes the signal to the A to D converter 109. The A to D converter converts the analog signal into a digital one which is sued as inputs for algorithms run by the microprocessor 110, (The algorithms which the microprocessor performs will discussed in detail with reference to FIGS. 3 and 4.) The deflection detection circuit 107 or 108, may be a deflection measuring transducer which produces an output of either a direct voltage, a direct current, or an alternating voltage or current with varying amplitudes dependent on the distance of deflection.

When the actuator is slid vertically with respect to the illustration of FIG. 1, compression means 103 and deflection detection circuit 108 is activated. The operation of the compression means 103 and related deflection detection circuit 108 is identical to the operation of the compression means 104 and deflection detection circuit 107, described above. The switch may require some tracking mechanism to provide ease of motion in the vertical and horizontal directions (not shown). In addition, another deflection detection circuit and compression means could be added to the switch to provide a third multilevel control signal. The compression motion for the third multi level signal could be in any direction, however, it is preferable to have it in a direction perpendicular to the direction that produces the second multilevel signal.

Figure 2:
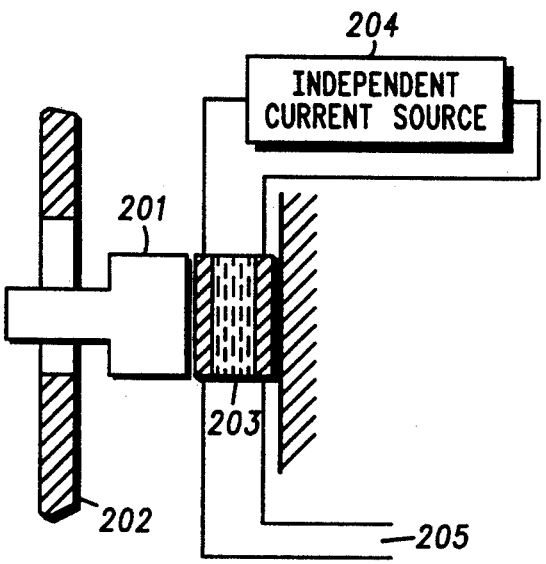
FIG. 2 illustrates a block diagram of a multi-level pushbutton switch that incorporates a conductive elastomer pad as the compression sensing device in accordance with the present invention.

The deflection detection circuits 107 and 108 may be implemented in several ways. For example, the deflection detection circuit may comprise a device that has its electrical impedance change with compression, or piezoelectric properties change with mechanical bending, or with Hall effect voltage changes with varying magnetic mechanical coupling, or with optical transmission properties changing with relative motion between two sliding surfaces. FIG. 2 illustrates a particular implementation of a switch comprising a conductive rubber or conductive elastomer pad as the deflection compression means. AS shown, the actuator 201 protrudes through a housing 202 and rests upon the surface of the conductive elastomer pad 203. Typically, as the conductive elastomer pad is compresses, its resistance decreases proportionally. Thus, by use of OHM's law, the voltage output on lines 205 is directly related to the direct current source 204 and the varying resistance of the conductive elastomer pad. The analog voltage produced on lines 205 is then routed to the A to D converter and subsequently to the microprocessor as describe above.

Figure 3:
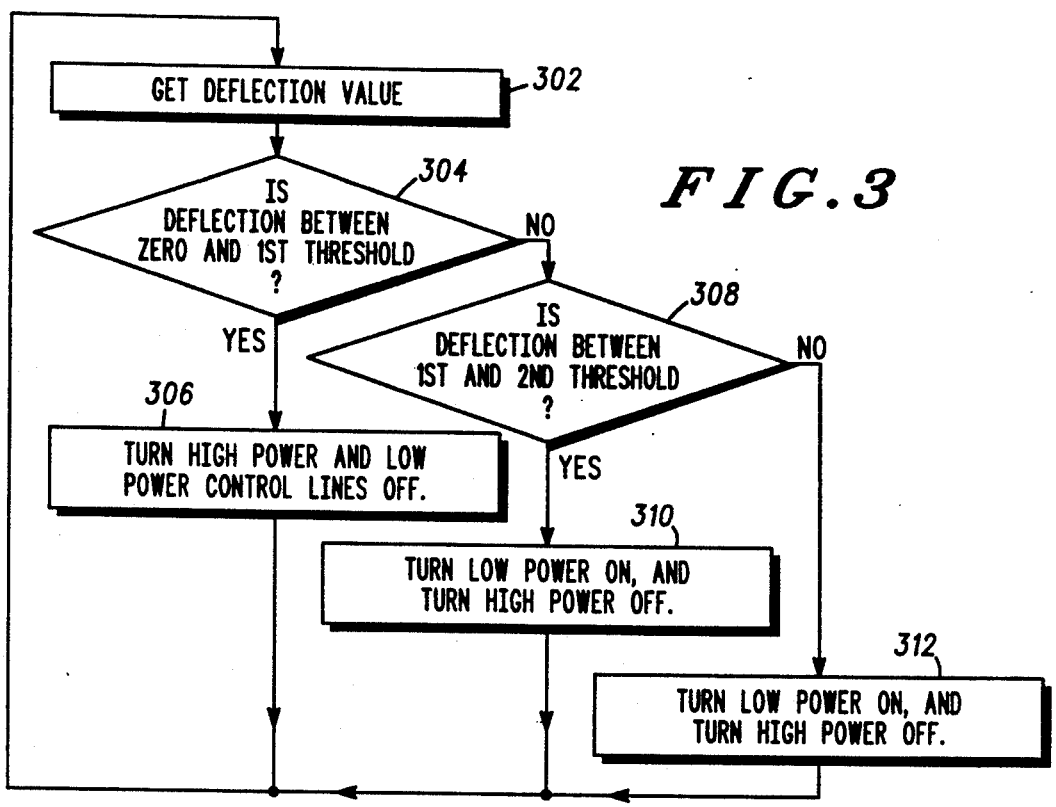
FIG. 3 illustrates a software control algorithm for an OFF/LOW POWER/HIGH POWER function that may be used by an RF transmitter in accordance with the present invention.

FIG. 3 illustrates a logic diagram of a control signal algorithm which the microprocessor may perform utilizing the multi-level signals produced by the switch of FIG. 1 to control low power, high power, and off functions of communication equipment. At step 302, the microprocessor obtains a numerical value from the A to D converter which is related to the deflection. Once the microprocessor has received the numerical value, the numerical value is compared against a first threshold 304. If the microprocessor determines that the switch has not be compressed such that the numerical value does not exceeds the first threshold, the communication equipment remains off 306. Once it is determined that the first threshold has not been exceeded, the process repeats at step 302.

If the microprocessor determines that the numerical value exceeds the first threshold, 304, it then determines whether it has exceeded a second threshold 308. If the numerical value has not exceeded the second threshold, the communication equipment is turned on to a low power state 312 and the process repeats at step 302. If the numerical value exceeds the second threshold 308, the communication equipment is turned on to a high power state 310 and the process repeats at 302. The numerical values chosen for the first and second thresholds are dependent upon the particular compression sensing circuit used. For example, if the conductive elastomeric pad has a variable resistance in the range of 1K ohms to 5K ohms and the current source is 1 mA, the output voltage inputted to the A to D converter will be between one and five volts, therefore, any digital value between one and five volts may be chosen as the first and second thresholds. However, it is desired that the first threshold voltage not be set too low such that any minor compression of the compressing sensing circuit causes the low power to turn on. The process of turning on a piece of communication equipment to a low or high power state is knows and will not be discussed.

Figure 4:
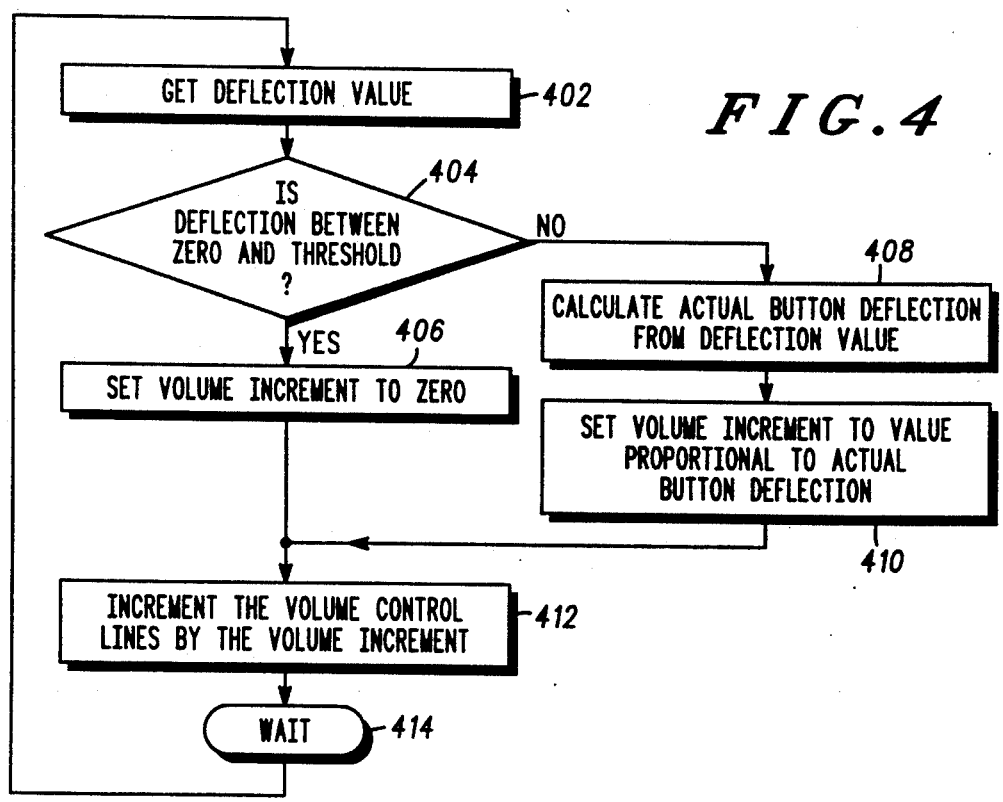
FIG. 4 illustrates a software control algorithm for ramping up audio volume of a portable and/or mobile radio at variable rates with a single pushbutton switch in accordance with the present invention.

In addition to performing the algorithm as described with reference to FIG. 3, the microprocessor can also perform a volume adjustment algorithm utilizing the same circuit as shown in FIG. 4. The volume adjustment algorithm controls the volume of the communication equipment based on a varying scale that is proportional to how hard the actuator is compressed or the velocity at which the actuator is pressed. Similarly, the volume could be ramped down based on how quickly the actuator is released. The process begins at step 402 where the microprocessor receives a numerical value from the A to D converter. The numerical value is compared against a nominal value for zero deflection, and a threshold value which represents a partial deflection 404. If the numerical value is within this range 404, the microprocessor determines that the actuator was not pressed 406, and the increment volume level is set to zero. Once the volume increment value has been set to zero, this value is sent to the volume adjustment circuit of the communication equipment (not shown). Once the volume has been adjusted, the process waits until the actuator is actuated 414. When the actuator is actuated the process repeats at step 402. The volume adjustment circuit is known and no further discussion of it will be presented.

When the microprocessor determines that the numerical value exceeds the threshold 404, the microprocessor computes an actual actuator deflection signal according to the particular compression sensing circuit being used 408. The actual actuator deflection value is used to calculate a volume increment value which is proportional to the actual actuator deflection 410. As a general example, the harder the actuator is pressed, the greater the deflection will be which in run will produce a greater volume increment value. The volume increment value is then routed to the volume circuit of the communication equipment 410 and the process repeats at step 414.

Figure 5:
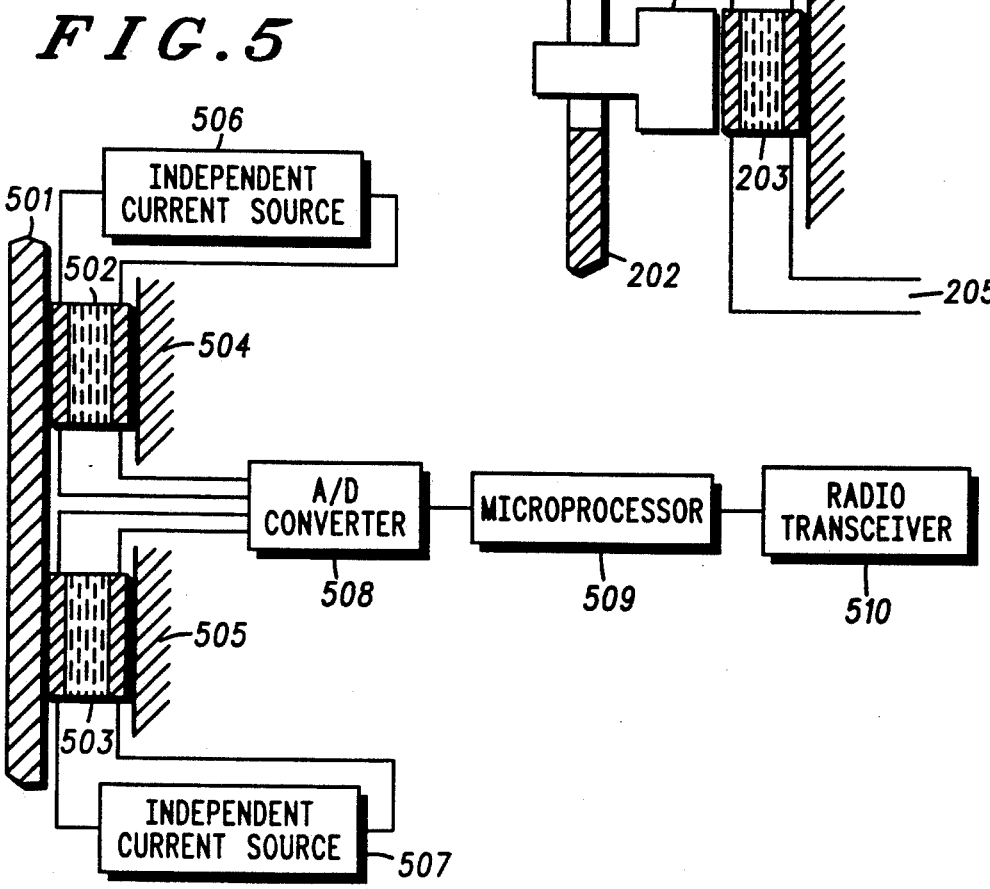
FIG. 5 illustrates a switch that utilizes the housing as an actuator in accordance with the present invention.

FIG. 5 illustrates a resilient housing actuated multi-level switch circuit. The resilient housing actuated multi-level switch comprises a resilient housing 501, two compression sensing circuits 502 and 503, two fixed edges 504 and 505, two constant current sourced 506 and 507, an A to D converter 508, a microprocessor 509, and, if the communication equipment is a radio, a radio transceiver 510. The housing 501 must be comprised of a material that is resilient such that it may be compressed and when the pressure is released restored to its original shape. (For example, a flexible plastic or fiberglass.) By having the housing compressible, it can adequately be compressed to provide actuation of the compression sensing circuits 502 or 503 to initiate the algorithms as described above. The resilient housing actuated switch works identically to the switch described with reference to FIG. 1, except that the housing actuates the switch as opposed to a separate actuator 101. In addition, to each of the compression sensing circuits 502 and 503 performing separate functions, when compressed together, they can produce a third multi-level signal.

This particular implementation of a resilient housing actuated multi-level switch allows a piece of communication equipment to be built at a substantially reduced cost, especially for use in environmentally hazardous areas. The savings can be obtained by the absence of having to hermetically seal, or some other type of sealing process, the cutouts in the housing which allow actuators to protrude through it.

The present invention has been described for use in communication equipment, in particular for portable and or mobile radios to provide control signals for algorithm which perform off/low power/high power and volume adjustment functions. However, it is apparent to a skilled practitioner that other implementations of the present invention can be obtained without deviating from the scope of this invention.

We claim:

1. A resilient housing actuated multi-level switch for housing and providing switching for an electronic circuit comprises:

housing means, consisting of a resilient material, for substantially housing the electronic circuit;

compression sensing means, physically contacting at least part of the housing means, for providing a compression signal when the at least part of the housing means is sufficiently compressed; and signal processing means, operably coupled to the compression sensing means, for comparing the compression signal with a first threshold such that when the compression signal exceeds the first threshold, the signal processing means performs at least part of a control signal algorithm.

2. In the resilient housing actuated multi-level switch of claim 1, the compression sensing means comprises a deflection measuring transducer.

3. In the resilient housing actuated multi-level switch of claim 1, the compression sensing means comprises a conductive elastomer pad and a deflection detection circuit, wherein the deflection detection circuit monitors compression of the conductive elastomer pad to produce the compression signal.

4. An improved communication radio that includes transceiving means for transceiving radio signal and a processing means, operably coupled to the transceiving means, for processing communication system information, wherein the improvement comprises:

housing means, consisting of a resilient material, for substantially housing the transceiving means;

first compression sensing means, physically contacting a first area of the housing means is sufficiently compressed; and signal processing means, operably coupled to the compression sensing means, for comparing the first compression signal with a first threshold such that when the first compression signal exceeds the first threshold, the signal processing means performs at least part of a first control signal algorithm.

5. The improved communication radio of claim 4 further comprises a second compression sensing means, physically contacting a second area of the housing means and operably coupled to the signal conversion means, for providing a second compression signal when the second area of the housing means is sufficiently compressed.

6. In the improved communication radio of claim 5, the signal processing means compares the second compression signal with the first threshold such that when the second compression signal exceeds the first threshold, the signal processing means performs at least part of a second control signal algorithm.

7. In the improved communication radio of claim 5, producing a third multi-level signal when the first area of the housing means and the second area of the housing means are sufficiently compressed, such that both the first compression signal and the second compression signal exceeds the first threshold.

* * * * *

UNITED STATES PATENT AND TRADEMARK OFFICE
CERTIFICATE OF CORRECTION

PATENT NO. : 5,239,691

DATED : August 24, 1993

INVENTOR(S) : Retzer et al.

It is certified that error appears in the above-identified patent and that said Letters Patent is hereby corrected as shown below:

In Col. 6, line 17, the word "signal" should be --signals--.

In Col. 6, line 24, after the word "means", insert thereat --, for providing a first compression signal when the first area of the housing means--.

Signed and Sealed this

Twenty-fourth Day of May, 1994

Attest:

BRUCE LEHMAN

Attesting Officer

Commissioner of Patents and Trademarks